United States Patent [19]
Wagner

[11] 3,759,150
[45] Sept. 18, 1973

[54] TIMING ARRANGEMENT FOR USE IN CAMERAS ADAPTED TO BE USED FOR MAKING LONG EXPOSURES

[75] Inventor: Karl Wagner, Ottobrunn, Germany

[73] Assignee: Agfa-Gevaert Aktiengesellschaft, Leverkusen, Germany

[22] Filed: June 14, 1972

[21] Appl. No.: 262,725

[30] Foreign Application Priority Data
June 18, 1971 Germany.................. P 21 30 197.3

[52] U.S. Cl. ............ 95/10 C, 95/10 CE, 95/10 CT, 95/53 EB
[51] Int. Cl........................... G03b 7/08, G03b 9/08
[58] Field of Search .......... 95/10 C, 10 CT, 10 CE, 95/53 EB

[56] References Cited
UNITED STATES PATENTS
3,581,634  6/1971  Ort .................................. 95/10 CT
3,636,841  1/1972  Wagner ............................ 95/10 CT Primary Examiner—Samuel S. Matthews
Assistant Examiner—Russell E. Adams, Jr.
Attorney—Michael S. Striker

[57] ABSTRACT

A photographic camera can be used for making long exposures of the type requiring the user to effect opening of the shutter and then to positively effect closing of the shutter after the elapse of an appropriate exposure time. A timing arrangement which notifies the user when to close the shutter comprises an energy-storing element, and supply means for supplying energy to the energy storing element. A photosensitive element, exposed to scene light, controls the rate of change of energy stored by the energy-storing element as a function of scene brightness, after the shutter has been opened, and permits the amount of energy stored by the energy-storing element to reach a predetermined value corresponding to a predetermined total amount of light impingement on the photosensitive element. An electronic threshold detector, connected with the energy-storing element and having an output, produces at its output a control signal only when the energy stored by the energy-storing element has reached the aforesaid predetermined value. An electrical signalling unit, such as a lamp or buzzer, is connected to the output of the threshold detector, and furnishes to the user of the camera a readily observable timing signal in response to generation by the threshold detector of the aforementioned control signal, thus notifying the user that closing of the shutter should be effected.

8 Claims, 1 Drawing Figure

PATENTED SEP 18 1973
3,759,150
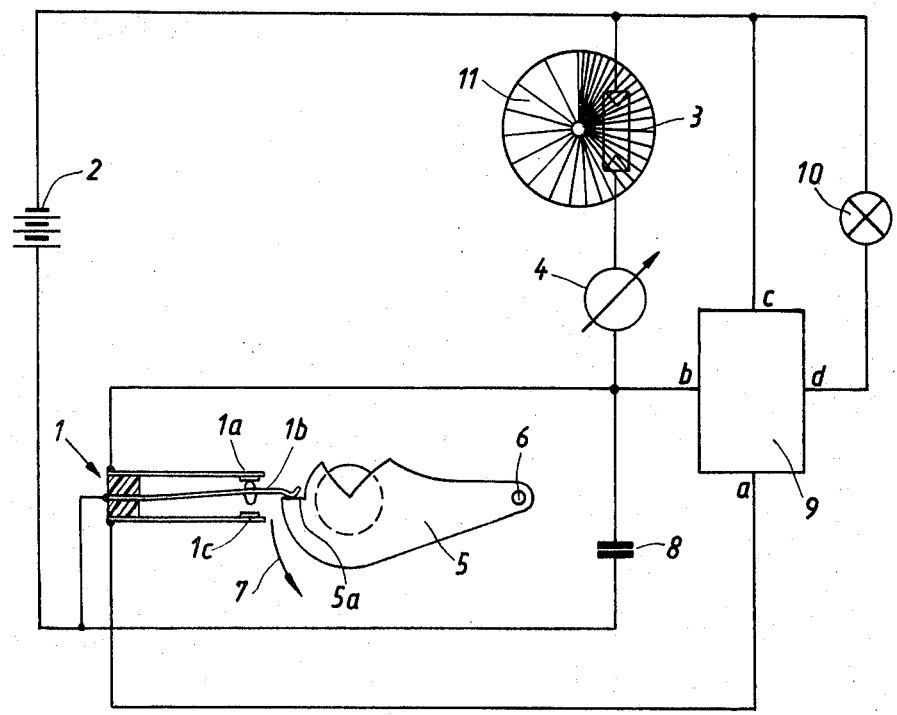

3,759,150

TIMING ARRANGEMENT FOR USE IN CAMERAS ADAPTED TO BE USED FOR MAKING LONG EXPOSURES

BACKGROUND OF THE INVENTION

The present invention relates to photographic cameras and particularly to cameras having provision for the taking of so-called long exposures. A long exposure must be taken, for example, when the available scene light is so low as to require a longer exposure time than can be provided by the automatic shutter-timing mechanism of the camera. In such event, the user of the camera himself must not only effect shutter opening, but activation of the shutter-release mechanism, but must also positively effect shutter closing, after an elapse of an appropriate exposure time. The invention relates to means for assisting the user of the camera in selecting the moment of shutter closing.

Commonly owned U.S. Pat. No. 3,636,841 discloses an arrangement of the type in question. That arrangement includes a moving-coil instrument having an indicating needle which is movable to coincidence with a certain dial marking. When the camera is used for taking long exposures, a capacitor is charged through a photoresistor, and the increasing capacitor voltage effects a continuous sweeping movement of the indicating needle of the moving-coil instrument. When the user of the camera decides that the needle is properly coincident with the aforesaid dial marking he effects shutter closing.

The arrangement of the aforementioned U.S. Pat. has the disadvantage that it requires of the user of the camera too much subjective judgement, because of the necessary decision as to whether proper coincidence with the needle with the dial marking has been achieved. The decision is not particularly easy, because the range of movement of the needle is of course quite small. Far-sighted persons, for example, have difficulty in detecting the exact moment of coincidence.

The use of a moving-coil instrument as the exposure-time signaller in the aforementioned U.S. Pat. was motivated by a desire to increase the usefulness of the moving-coil instrument which was anyway provided to monitor scene brightness. However, and as just explained, the additional purpose of notifying the user that the shutter should be closed is not adequately achieved.

SUMMARY OF THE INVENTION

It is accordingly the general object of the present invention to overcome such disadvantages as described above.

It is a more particular object to provide a novel and improved timing aid which overcomes such disadvantages.

It is a further object to provide a timing aid which abruptly generates a timing signal readily observable by the user of the camera, at the moment when the user should effect closing of the shutter.

It is another object to provide such a timing aid which takes into account the finite response time of a human user responding to such timing signal.

These objects, and others which will become clearer hereafter, can for instance be met by an arrangement which comprises a shutter, energy-storing means, and supply means for supplying energy to the energy-storing means. Photosensitive means, exposed to scene light, controls the rate of change of energy stored by the energy-storing means as a function of scene brightness and in response to opening of the shutter, and permits the amount of energy stored by the energy-storing means to reach a predetermined value corresponding to a predetermined total amount of light impingement on the photosensitive means. A threshold-detector, connected with the energy-storing means and having an output, produces at such output a control signal, when and only when the energy stored by the energy-storing means has reached the aforementioned predetermined value. Importantly, electric signalling means, connected to the output of the threshold-detector, furnishes to the user of the camera an abrupt and readily observable timing signal in response to generation by the threshold-detector of the aforementioned control signal, thus notifying the user that closing of the shutter should be effected.

The electrical signalling means can for instance be a signal lamp which is illuminated for a brief moment when the user is to be notified that the shutter should be closed. Alternatively, the lamp can be illuminated until such time as the shutter is actually closed, or the lamp can be illuminated at the moment the shutter is opened and then become extinguished at the moment the user should effect closing of the shutter. Other variations are possible.

The electrical signalling means can be a light emitting diode although a moving-coil instrument can also be used. It is also possible to employ a moving-coil instrument as a light-meter instrument, e.g., to determine whether the scene light is sufficient for automatic exposures or whether so low as to necessitate the use of a tripod and a long exposure. The signalling means could then be a signal lamp, and the timing arrangement could comprise a capacitor charged via a photoresistor exposed to scene light. For the sake of simplicity, the same photoresistor can be used both for taking readings with the moving-coil instrument of scene light, and also can be used with the signal lamp during the making of long exposures with a tripod as a timing aid. Also for the sake of simplicity, the moving-coil instrument can be left in circuit with the photoresistor during the timing operation performed by the timing arrangement during the making of a long exposure, providing the internal resistance of the moving-coil instrument is negligible compared to that of the photoresistor, at least when the intensity of the impinging light is low — i.e., so that the presence of the moving-coil instrument will not distort the charging operation of the capacitor in the long exposure mode.

There are several manners in which change of energy stored by the capacitor (or other energy-storing element) is used for timing purposes. It is particularly advantageous to short-circuit the capacitor prior to opening of the shutter, and then at the time of shutter opening connect the capacitor to a charging battery and in series with the photoresistor. Alternatively, however, the capacitor might be initially charged at the time of shutter opening, and then permitted to discharge to a lower voltage to effect activation of the signal lamp, or other signalling unit. Also, the energy-storing means need not be a simple capacitor, but could be another energy-storing element.

For the sake of simplicity, it would for instance be possible to avoid cumbersome switching operations, by permitting the signal lamp to briefly light up when other than long exposures are being made — i.e., during automatic daylight operation, or when a flash unit is employed. However, prolonged furnishing of a signal, whether an illumination or an extinguishing, would be provided, as one possibility, only when the signal lamp is being used as a timing aid for the taking of long exposures with a tripod, etc.

Because the response time of the operator is finite, it is contemplated for example to provide a photoresistor whose resistance decreases with increasing light intensity, and which decreases to a higher extent when the impinging light is already quite low — i.e., under lighting conditions which require the taking of long exposures. In this way the signal lamp will be illuminated slightly "ahead of time," to compensate for the response time of the human user.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates in somewhat schematic form one embodiment according to the invention.

DESCRIPTION OF THE PREFERRED EMBODIMENTS

One of the blades 5 of a shutter is pivotable about an axis 6 between positions in which the shutter is open and in which the shutter is closed. Blade 5 has a stepped portion 5a upon which rests the median contact 1b of a two-way switch 1. The springiness of median contact 1b normally urges it into contact with contact 1c. However, when the shutter is closed, as depicted in the FIGURE, the shutter blade 5 forces the median blade 1b into engagement with contact 1a.

When the shutter is closed, contacts 1a, 1b are in engagement and together close a series circuit composed of battery 2, photoresistor 3 and moving-coil instrument 4. Photoresistor 3 is exposed to scene light, and the intensity of such light determines the resistance value of the resistor, and thus the amount of current flow in the coil of indicator 4. Accordingly, the indicating needle of indicator 4 will move to a position indicative of the scene brightness.

Indicator 4 indicates to a user whether or not the scene brightness is so low as to require the taking of a long exposure. If the need for a long exposure is indicated, the user will in conventional manner set the camera to "B" operation — i.e., to a position permitting the user to select both the time of shutter opening and the time of shutter closing. Thus, for instance, when the user presses down the shutter-release button, he will hold it down to maintain the shutter open and then release the button to permit the shutter to close.

Opening of the shutter involves movement downwards of illustrated blade 5, and electrical engagement between contacts 1b and 1c. It will be noted that when contacts 1a, 1b are engaged the capacitor 8 is short-circuited and cannot store energy. However, when contacts 1b, 1c engage, the capacitor 8 is connected in series with battery 2, photoresistor 3 and moving-coil instrument 4. According to well known principles, the capacitor 8 will tend to charge to the voltage of battery 2 and at a rate which is a function of the resistance of photoresistor 3, and which is thus a function of scene brightness. For the sake of simplicity, and to avoid the provision of further switches, indicator 4 which is not actually needed during the taking of the long exposure is kept in the circuit, because its internal resistance is negligible compared to that of photoresistor 3 when light of low intensity impinges on the photoresistor.

Connected directly across capacitor 8 is an electronic threshold-detector 9, whose internal circuitry can be of any of the extremely well known types, such as for instance a Schmitt trigger. When the capacitor 8 charges up to a voltage corresponding to the threshold triggering voltage of threshold-detector 9, detector 9 produces an output signal at its output c, d which effects illumination of signal lamp 10. The values of photoresistor 3, capacitor 8, and the trigger voltage of unit 9 are so chosen, that capacitor 8 reaches the trigger voltage at the time that the film being exposed has been exposed to a predetermined total amount of light. Clearly, during the film exposure time, if the scene brightness suddenly increases, the resistance of resistor 3 will decrease resulting in faster charging of capacitor 8 and earlier reaching of the threshold value, corresponding to the presumed faster exposure of the film actually being exposed.

When the threshold voltage has been reached by capacitor 8, the lamp 10 is illuminated and remains illuminated until the shutter-control button is released to cause closing of the shutter. At the moment of shutter closing, blade 5 restores the engagement of contacts 1b, 1c, shorting and thereby discharging the capacitor 8 and immediately causing the capacitor voltage to drop below the threshold value necessary to maintain lamp 10 illuminated.

Provision of graduated light-obstructing filter 11 in front of the photoresistor 3 — i.e., between the resistor 3 and the impinging light — permits adjustment of the timing operation as a function of different film sensitivities and/or different aperture sizes. For instance, if a more sensitive film is used requiring less total light fall to effect proper exposure, an adjusting ring (not shown) can be turned to a setting corresponding to such more-sensitive film. This would result in turning of graduated filter 11 to a position in which a more translucent portion of the filter is placed in the light path of resistor 3. Accordingly, resistance value of resistor 3 will be lower, and the charging time of capacitor 8 will be shortened in correspondence with the decreased exposure time needed for the more sensitive film. A similar relationship applies to an adjustment of the filter position as a function of selected aperture size, or other parameters.

The operation of the illustrated arrangement should be apparent from what has already been said:

When a photograph is to be taken, the user of the camera closes a (non-illustrated) switch which applies the battery voltage to the series connection of components 3, 4 and causes indicator 4 to indicate the scene brightness. If the scene brightness is sufficient for automatic shutter control, the user presses the shutter button to effect shutter opening and the shutter is automatically closed after an appropriate exposure time.

However, if indicator 4 indicates light intensity so low as to require an exposure time exceeding the longest possible automatic exposure time, the user sets the camera in conventional manner for "B" operation. Thereupon, the user will for instance set the aperture size in conventional manner, thereby effecting a corresponding turning of graduated filter 11. The user presses the shutter-control button opening the shutter, and holds the button down to maintain the shutter open. When the capacitor 8 has charged to the predetermined threshold voltage of threshold-detector 9, lamp 10 lights up, notifying the user that he should now permit the shutter to close. When the shutter is closed, the capacitor 8 is short-circuited. and the lamp 10 is extinguished.

To account for the finite response time of the human user, it is of advantage to select a photoresistor whose light versus resistance characteristic has a first steepness of the part of the characteristic corresponding to high intensity of light, and a different steepness at the part of the characteristic curve corresponding to lower intensity light — i.e., to the low intensity light prevailing during and necessitating the taking of long exposures. For instance, the resistance value of resistor 3, when the light intensity is quite high, could increase with decreasing light at a certain rate, and increase with decreasing light at a higher rate when the light intensity is quite low — i.e., of such low intensity as to necessitate long exposure times.

It hardly need be mentioned that the camera can also have provision for the taking of photographs using a flash unit, and of course it can be provided with means for mounting the camera on a tripod, and can be provided with any of the conventional remote-control shutter-activated arrangements known, for instance those incorporating a cable leading to the camera.

Likewise, it is also possible to use other switching means in place of the two-way switch 1 shown. Such other switch means could establish the necessary connection between the illustrated or equivalent components in a different fashion. Furthermore, the mechanical switching means need not be coupled to the actual shutter blade, but can also be coupled to the shutter-activating mechanism, e.g., to the linkage between the shutter-control button and the shutter blades.

It will be understood that each of the elements described above, or two or more together, may also find a useful application in other types of constructions and circuits differing from the types described above.

While the invention has been illustrated and described as embodied in a photographic camera having provision for the taking of long exposures, it is not intended to be limited to the details shown, since various modifications and structural changes may be made without departing in any way from the spirit of the present invention.

Without further analysis, the foregoing will so fully reveal the gist of the present invention that others can be applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In combination with a photographic camera of the type which can be used to make long exposures and which includes means which must be positively actuated by the user to effect opening of the shutter and thereafter positively actuated by the user to effect closing of the shutter after the elapse of an appropriate exposure time, a timing arrangement for assisting the user in such non-automatic operation of the shutter, comprising, energy-storing means; supply means for supplying energy to said energy-storing means; photosensitive means exposed to scene light and operative in response to opening of said shutter for changing the amount of energy stored in said energy-storing means at a rate dependent upon scene brightness and permitting the amount of energy stored by said energy-storing means to reach a predetermined value corresponding to a predetermined cummulative total amount of light impinging upon said photosensitive means; electronic threshold detector means, connected with said energy-storing means and having an output, for producing at said output a control signal only when the energy stored by said energy-storing means has reached said predetermined value; and electrical signalling means connected to said output of said electronic threshold detector means and operative for furnishing to the user of the camera a readily observable timing signal in response to generation by said electronic threshold detector means of said control signal, thus notifying the user that closing of said shutter should be effected.

2. An arrangement as defined in claim 1, wherein said electrical signalling means comprises an illuminable lamp.

3. An arrangement as defined in claim 1, wherein said electrical signalling means comprises a light emitting diode.

4. An arrangement as defined in claim 1, and further including switch means for connecting said energy-storing means in circuit with said supply means and said photosensitive means in response to opening of said shutter.

5. An arrangement as defined in claim 4, wherein said switch means is mechanically connected with said shutter.

6. An arrangement as defined in claim 4, wherein said switch means is mechanically connected with the shutter-activating means.

7. An arrangement as defined in claim 1, wherein said photosensitive means comprises a photoresistance whose resistance decreases with increasing intensity of impinging light and at a lesser rate when the light intensity is higher and at a higher rate when the light intensity is lower.

8. An arrangement as defined in claim 1, wherein said energy-storing means comprises a capacitor.

* * * * *